Figure 1:
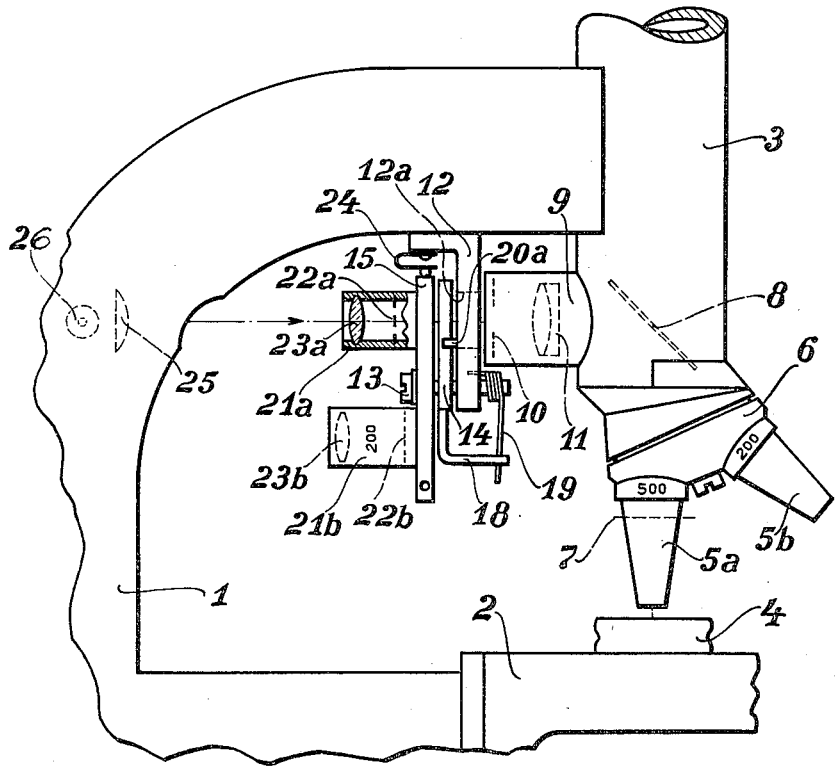

Oct. 16, 1956 — R. PINKOWSKI — 2,766,655
PHASE CONTRAST MICROSCOPE
Filed Nov. 2, 1953

INVENTOR.
Reinhold Pinkowski
BY

United States Patent Office 2,766,655
Patented Oct. 16, 1956

2,766,655

PHASE CONTRAST MICROSCOPE

Reinhold Pinkowski, Wetzlar (Lahn), Germany, assignor to Ernst Leitz, G. m. b. H., Wetzlar, Germany Application November 2, 1953, Serial No. 389,825

Claims priority, application Germany November 3, 1952

6 Claims. (Cl. 88—39)

This invention relates to phase contrast microscopy and has particularly for its purpose the extension of this technique to the study of opaque or semi-opaque objects. In known phase contrast microscopes an especially annular phase plate has been arranged in the exit pupil of the microscope objective. The illuminating light passing an aperture diaphragm, geometrically corresponding to the phase plate, is concentrated onto this phase plate. In a microscope for transparent objects this diaphragm is arranged in the microscope condenser. In a microscope equipped with an opaque illuminator for opaque objects in which the objective itself is used as condenser, the aperture diaphragm, the image of which is formed in the exit pupil of the objective, must be located in the optical axis of the opaque illuminator.

In a phase microscope, having objectives of different powers, arranged on a nose piece, the exit pupils of the objectives lie in different planes. Therefore the image of the aperture diaphragm must be projected in different planes and in different dimensions. In a known microscope for transparent objects an arrangement is provided consisting of a condenser and a rotatable turret member, carrying a plurality of aperture diaphragms in different planes and dimensions. This construction cannot be used for opaque illumination.

The aperture diaphragm in phase contrast systems is imaged in the rear focal plane of the objective. With a strong objective the rear focal plane is close to the object and the opening is small. With a weak objective this plane is further away from the object and the opening is greater. If a diaphragm is moved axially in an opaque illuminator, a reverse result is obtained and this is not desirable.

The object of the invention is to provide an improved optical system for use in a phase contrast microscope for opaque illumination having a nose piece for different objectives and an arrangement for homogeneous illumination of the object.

According to the invention, which in some aspects embodies the Koehler principles of optical illuminating systems, a rotatable turret member supporting a plurality of optical systems is included as a novel element in the phase contrast system. Each system consists of a lens and an aperture diaphragm in a predetermined spaced relation and corresponds to one of the objectives and may be inserted into the illumination pathway so that by rotation of the rotatable carrier, the unit optical system corresponding to the powers of the selected objective may be inserted in the horizontal main optical system in operative optical alinement with the axis of the light rays. Thus the invention is distinguished over prior disclosures in which either the diaphragm or the lens are separately adjusted and positioned. If only the diaphragm is adjusted and the position and/or the powers of the lens is not changed, the illumination becomes poorer and this is also the result if the diaphragms are supported on a movable carrier and are arranged according to size and position. The systems are preferably mounted in tubes which may be removed and replaced.

Specifically the object of this invention, which is for use with a microscope having a nose piece with a plurality of objectives of different powers, is to provide a plurality of different optical systems, each consisting of a lens and an apertured diaphragm in the form of a unit within a tubular housing, the units being supported upon a rotatable carrier so arranged that a unit with its optical system therein, different from the other units' optical systems, by rotation of the carrier may be inserted into axial alinement with the pathway of the incoming light. The lens and the diaphragm in each unit system being so dimensioned in powers, sizes and spacing that the inserted optical system fulfills the conditions required by the selected objective for phase contrast observation so as to obtain the maximal utilization of the light source.

Another object of the invention is to provide one of the tubes with an iris diaphragm instead of the annular aperture diaphragm for obtaining bright field illumination.

Another object of the invention is to dispose a diffusing plate in spaced relation to and in alinement with the actually operating system, instead of inserting said iris diaphragm. The transparency of the diffusing plate is of such a degree that there can be obtained the same brightness for both observing types.

Figure 2:
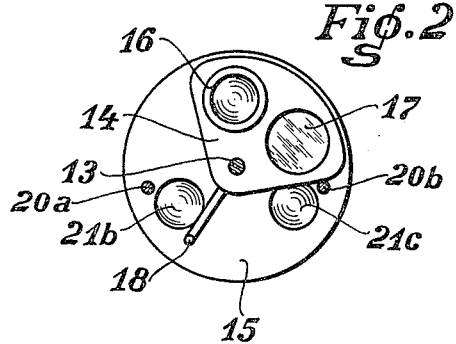

Other objects and advantages of the invention will become apparent from the detailed description which follows when taken in conjunction with the accompanying drawing in which Fig. 1 shows a side view of the middle part of a microscope with the illumination arrangement embodying one form of the invention, and Fig. 2 shows a side view of the sector shaped carrier and the rotatable turret member of the microscope.

Referring more particularly to Fig. 1 there is shown a microscope stand 1 carrying the stage 2 and the body tube 3. On the stage 2 is positioned the object 4. A nose piece 6 carrying the objectives 5a, 5b, etc., is fixed on the body tube. 7 marks the exit pupil of the inserted objective 5a. The semi-transparent mirror 8 is adapted for reflecting the illumination light, coming from a light source 26 having a usual collector lens 25. The annular phase plates are disposed at the exit pupils of each objective. In a tube 9, attached to the body tube 3, is arranged a field stop 10 and a lens 11. On the stand 1 is provided an angular arm 12 having an opening 12a. The angular arm 12 has an axis 13 on which a sector shaped carrier 14 is rotatable. The carrier 14 has the opening 16 and another opening with a diffusing plate 17 and a handle 18, the motion of which is limited by two stops 20a, 20b. The handle 18 is held in a resting position by the spring 19. A rotatable turret member 15 is also mounted on the axis 13, and is provided with a stop member 24. The turret member 15 carries tubes 21a, 21b, 21c. Each of these tubes contains an aperture diaphragm 22a, 22b, etc., in different planes and different ring shaped areas, in order to conjugate with the phase plate in the objectives. By rotating the turret 15 the tubes 21a, 21b, 21c may be desirably inserted and aligned with the illumination pathway. One of the diaphragms may be replaced by an iris diaphragm, not shown, for obtaining bright field illumination. The tubes further contain lenses 23a, 23b, etc. of different powers in spaced relation to the aperture diaphragms. Inasmuch as the inserted unit optical system must correspond to the powers of the selected objective, the relationship between the different lenses and diaphragms within the different systems is as follows. The lens 11 serves, together with the objective, to image the apertured diaphragms 22a, 22b, 22c, respectively in the rear focal plane of the objective and the light rays pass through the objective twice, before and after the reflection from the object. The field stop 10 will be imaged in known manner in the plane of the object. The lenses 23a, 23b, 23c, respectively, serve to obtain a homogeneous illumination of the field stop 10 or to image, together with the collector lens 25, the light source in the plane of the diaphragm. It will be understood, that, depending upon the powers of the selected objective, the image of the light source must have a diameter at least as large as the diameter of the ring formed opening in the diaphragms. The illumination conditions for the diaphragm must also be changed and this will be realized by the lens 23. The latter must therefore occupy a definite position and have a definite size in order to function as intended and the same conditions must be observed with respect to the field stop 10.

As herein before noted, the distance between the lens and the diaphragm in each system unit is predetermined or critical because the annular opening in the diaphragm should always be illuminated with maximal illumination. As the objective is changed, so must the optical unit system be changed to correspond. On the tubes, marks are engraved concerning the corresponding objectives 5a, 5b, etc. In the drawing the aperture diaphragm 22a, illuminated by the lens 23a, is projected onto the phase plate in the exit pupil 7 of the actually operating objective 5a. When replacing this objective by an objective having a different magnifying power, the exit pupil may have another position. Therefore a second system, comprising another aperture diaphragm and another lens adapted to this objective must be inserted by turning the turret member 15. If two objectives have the same or nearly the same exit pupil only one tube is required.

If the microscope is used for examination with bright field illumination and phase contrast it is desirable to be able to change from one to the other as quickly as possible. For this reason, an iris diaphragm, not shown, may be inserted instead of the annular diaphragm in one of the tubes 21a, 21b, 21c so that at the same time a bright field illumination with a desired aperture may be obtained.

It is also possible to insert an opal glass disk in the rays pathway, for example, as shown at 17, which then is positioned behind the annular diaphragm and prevents the formation of light rings in the rear focal plane of the objective. The degree of transparency of such a disk is so selected that the phase contrast formation and the bright field are almost equally illuminated. Such an arrangement permits undisturbed observation in spite of rapid changeover by rotation of the tube turret.

While I have illustrated a certain embodiment which my invention may assume it will be understood that the same may be otherwise embodied within the scope of the following claims.

Having described my invention, I claim:

1. In a phase contrast microscope for examining opaque and semi-opaque objects, in combination, a microscope tube, a nose piece rotatably mounted thereon, a plurality of objectives of different powers mounted on the nose piece to be moved into optical axial alinement with the optical observation axis of the microscope, a semi-transparent mirror in said microscope tube for reflecting the incoming light from a source of light to the objective, a field stop and a field stop lens, a tubular extension on the microscope for supporting said field stop and field stop lens in permanent spaced relation in front of the mirror with the field stop lens between the field stop and the mirror and axially alined with the axis of the incoming light, a source of light and a collector lens therefor mounted in the microscope in optical axial alinement with the field stop and the field stop lens with the collector lens between the light source and the field stop, a plurality of different optical systems, each system consisting of a lens and an annular apertured diaphragm forming a unit, a housing for each unit supporting the lens and the diaphragm therein, the lenses in said units being of different powers, the spacing between the lens and the diaphragm in each unit being different, the diaphragms having differently shaped apertures, respectively, to conjugate each of said different diaphragms with the phase plate in the selected objective, a movable carrier on said microscope for supporting all of said unit housings whereby to position any one of said unit systems in operative axial alinement with and between said collector lens and said field stop in response to the powers of the selected objective, the lenses in the said units providing homogeneous illumination of the field stop, and identifying corresponding marks on said unit housings and on the said microscope objectives.

2. In a phase contrast microscope for examination of opaque and semi opaque objects, in combination, a microscope tube, a nose piece rotatably mounted thereon, a plurality of objectives of different powers mounted on said nose piece to be moved into axial alinement with the observation axis of the microscope, a semitransparent mirror in the microscope tube for reflecting the incoming light to the objective, a source of light and a collector lens therefor, a field stop and a field stop lens in said microscope in front of said mirror with the field stop lens nearest the mirror, all of the aforesaid optical elements being optically alined with the pathway of the incoming light, a plurality of optical units, each unit consisting of a lens and an apertured diaphragm, each optical unit being optically different from the other optical units, means for movably supporting all of said units to insert any one of them into operative optical alinement with the pathway of the incoming light whereby said field stop lens, together with the microscope objective, images said unit diaphragm in the rear focal plane of the objective and said field stop is imaged in the plane of the object, said optical unit lens imaging together with said collector lens the source of light onto the plane of the unit diaphragm to provide illumination conditions in response to the powers of the selected objective for the examination.

3. In a phase contrast microscope according to claim 2 wherein the said means is a rotatably mounted carrier on the microscope supporting the said different optical units and including means for positioning said carrier with the selected optical unit in axial alinement with the pathway of the incoming light.

4. In a phase contrast microscope according to claim 2 wherein the said unit apertured diaphragm faces the said field stop.

5. In a phase contrast microscope according to claim 1 in which each of said different optical systems is assembled within a tubular unitary support mounted upon said common rotatable support.

6. In a phase contrast microscope according to claim 1 including a swingable carrier mounted upon said microscope, a diffusing plate mounted in said carrier and means for moving said carrier to selectively position the said diffusing plate into or out of axial optical alinement with any one of the said different optical systems.

References Cited in the file of this patent

UNITED STATES PATENTS

| | | |
|---|---|---|
| 2,078,181 | Land | Apr. 20, 1937 |
| 2,146,506 | Maisch | Feb. 7, 1939 |
| 2,427,689 | Osterberg et al. | Sept. 23, 1947 |
| 2,553,108 | Osterberg et al. | May 15, 1951 |

OTHER REFERENCES

Jupnik et al.: "Phase Microscopy With Vertical Illumination," an article in Journal of the Optical Society of America, vol. 38, No. 4, April 1948, pages 338–341.